(12) United States Patent
Wang et al.

(10) Patent No.: US 10,574,989 B2
(45) Date of Patent: Feb. 25, 2020

(54) TEMPORAL LOCAL ACTIVITY FOR QUANTIZATION PARAMETER (QP) OFFSET FOR VIDEO CODING

(71) Applicant: ARRIS Enterprises LLC, Suwanee, GA (US)

(72) Inventors: Limin Wang, San Diego, CA (US); Seungwook Hong, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 47 days.

(21) Appl. No.: 15/786,147

(22) Filed: Oct. 17, 2017

(65) Prior Publication Data

US 2018/0109794 A1 Apr. 19, 2018

Related U.S. Application Data

(60) Provisional application No. 62/408,930, filed on Oct. 17, 2016.

(51) Int. Cl.
*H04N 19/124* (2014.01)
*H04N 19/176* (2014.01)

(52) U.S. Cl.
CPC ......... *H04N 19/124* (2014.11); *H04N 19/176* (2014.11)

(58) Field of Classification Search
CPC .................................................. H04N 19/124

USPC .................................................... 375/240.03
See application file for complete search history.

(56) References Cited

U.S. PATENT DOCUMENTS

| 2008/0181309 A1* | 7/2008 | Lee | H04N 19/197 375/240.16 |
| 2015/0319437 A1* | 11/2015 | Zhang | H04N 19/176 375/240.03 |
| 2015/0326857 A1* | 11/2015 | Zhang | H04N 19/142 375/240.03 |

OTHER PUBLICATIONS

Cornish-Bowden, Basic Mathematics for Biochemists, 2012, Springer Science & Business Media, p. 6 (Year: 2012).*

* cited by examiner

*Primary Examiner* — Joseph G Ustaris
*Assistant Examiner* — Amir Shahnami
(74) *Attorney, Agent, or Firm* — Thomas A. Ward (57) ABSTRACT

A video processing system is provided that uses a Quantization Parameter (QP) offset in the encoding process. Spatial local activity has successfully been used in video coding for improved quality, which assigns relatively smaller quantization step sizes to flat areas, such as blue sky, and larger quantization step sizes to busy areas, such as grass. The QP offset provides temporal local activity and improves video quality.

3 Claims, 7 Drawing Sheets

$QP(i) = QP(i) + \Delta QP_{SPATIAL}(i) + \Delta QP_{TEMPORAL}(i)$ — 610

WHERE,

- $QP(i)$ IS THE QP VALUE FOR BLOCK $i$ THAT ARE DETERMINED BY RATE CONTROL, — 626

- $\Delta QP_{SPATIAL}(i)$ IS THE QP OFFSET DUE TO THE NORMALIZED BLOCK SPATIAL LOCAL ACTIVITY FOR BLOCK $i$ PLUS THE AVERAGE BLOCK OFFSETS PER GOB, REFER TO [ ], — 630

- $\Delta QP_{TEMPORAL}(i) = \Delta QP(i) - \Delta QP_{PIC}$ IS THE QP OFFSET DUE TO THE NORMALIZED BLOCK TEMPORAL LOCAL ACTIVITY FOR BLOCK $i$ PLUS THE AVERAGE QP OFFSET — 640

- $\Delta QP(i) = 6 \times LOG_2 \left( \frac{\beta \times act(i) + avg\_act}{act(i) + \beta \times avg\_act} \right)$, THE NORMALIZED TEMPORAL LOCAL ACTIVITY OF BLOCK $i$, — 650

- $\Delta QP_{PIC} = 6 \times \left( \frac{1}{N_i} \sum_{\in\,(picture)} LOG_2 \left( \frac{\beta \times act(i) + avg\_act}{act(i) + \beta \times avg\_act} \right) \right)$ — 660

IS THE AVERAGE OF THE NORMALIZED TEMPORAL LOCAL ACTIVITIES FOR THE BLOCKS WITHIN A GOB,

- $\beta$ IS A CONSTANT, IT CAN BE, FOR EXAMPLE, SET TO A VALUE OF 2. — 670

TEMPORAL LOCAL ACTIVITY FOR QUANTIZATION PARAMETER (QP) OFFSET FOR VIDEO CODING

CROSS REFERENCE TO PROVISIONAL

This Application claims priority under 35 U.S.C. § 119(e) from earlier filed U.S. Provisional Application Ser. No. 62/408,930 filed on Oct. 17, 2016 and incorporated herein by reference in its entirety.

FIELD

This disclosure relates generally to the field of encoding video for better subjective quality.

BACKGROUND

In general, the coding technology has been used to compress audio and video data. Dependence on codec technology is very high, especially in video processing technologies in which large amount of data is processed.

Meanwhile, since one of the important factors to evaluate performance in the codec technology is compression efficiency, many efforts have been made to increase a data compression rate by means of the codec.

The encoders and decoders widely used for video processing can process a variety of video formats. Codecs are needed to efficiently codes and decode input videos having all possible video formats or bit depths.

There is rapid growth in the technologies associated with the generation, transmission, and reproduction of media programs. These technologies include coding schemes that permit digital versions of the media program to be encoded to compress them to much smaller size and facilitate their transmission, storage, reception and playback. These technologies have application in personal video recorders (PVRs), video on demand (VOD), multiple channel media program offerings, interactivity, mobile telephony, and media program transmission.

Without compression, digital media programs are typically too large to transmit and/or store for a commercially acceptable cost. However, compression of such programs has made the transmission and storage of such digital media programs not only commercially feasible, but commonplace.

The High Efficiency Video Coding (HEVC) coding standard (or H.265) is a recent coding standard promulgated by the ISO/IEC MPEG standardization organizations. The coding standard preceding HEVC included the H.262/MPEG-2 and the subsequent H.264/MPEG-4 Advanced Video Coding (AVC) standard. H.264/MPEG-4 has substantially replaced H.262/MPEG-2 in many applications including high definition (HD) television. HEVC supports resolutions higher than HD, even in stereo or multi-view embodiments, and is more suitable for mobile devices such as tablet personal computers.

As in other coding standards, the bitstream structure and syntax of HEVC compliant data are standardized, such that every decoder conforming to the standard will produce the same output when provided with the same input. Some of the features incorporated into the HEVC standard include the definition and processing of a slice, one or more of which may together comprise one of the pictures in a video sequence. A video sequence comprises a plurality of pictures, and each picture may comprise one or more slices. Slices include non-dependent slices and dependent slices. A non-dependent slice (hereinafter simply referred to as a slice) is a data structure that can be decoded independently from other slices of the same picture in terms of entropy encoding, signal prediction, and residual signal construction. This data structure permits resynchronization of events in case of data losses. A "dependent slice" is a structure that permits information about the slice (such as those related with tiles within the slice or wavefront entries) to be carried to the network layer, thus making that data available to a system to more quickly process fragmented slices. Dependent slices are mostly useful for low-delay encoding.

Like its predecessors, HEVC supports both temporal and spatial encoding of picture slices. HEVC defines slices to include I-slices, which are spatially, but not temporally encoded with reference to another slice. I-slices are alternatively described as "intra" slice encoded. HEVC also defines slices to include P (predictive) slices, which are spatially encoded and temporally encoded with reference to another slice. P-slices are alternatively described as "inter" slice encoded. HEVC also describes slices to include bi-predictive (B)-slices. B-slices are spatially encoded and temporally encoded with reference to two or more other slices. Further, HEVC consolidates the notion of P and B slices into general B slices that can be used as reference slice.

Rate control plays an important part of video coding technologies. This is due at least in part to the fact that the bit rate of the source material may not be well matched to available channel bandwidth used to deliver the compressed bit streams. It is also due at least in part to the fact that the techniques employed by the coding technologies compress the source material vary in efficiency from frame to frame of the video sequence, or even slice to slice. Further, even if the compression efficiency of was the same for each frame, changing source material also impacts the required channel bandwidth. For example, scenes with a high level of detail and little repeatability from frame to frame (sports programs showing spectators, for example) typically require very high bandwidth, while another scene of the same sports program showing only contestants and the playing field would not. Buffering of the source material and/or the coded stream may ameliorate some of these problems.

Spatial local activity has successfully been used in video coding for better subjective quality, which assigns relatively smaller quantization stepsizes to flat areas, such as blue sky, and larger quantization stepsizes to busy areas, such as grass. However, the pursuit of higher quality of multi-dimensional landscapes needs improvement. Accordingly, the use of temporal local activity and its applications to QP offset is disclosed herein.

SUMMARY

In accordance with one aspect of the invention, a method of providing a method for determining a Quantization Parameter (QP) offset for video coding an $i^{th}$ block of a reference picture is provided. The method includes the steps of defining a temporal local activity for the block in a reference picture, determining a QP value by rate control, adjusting the QP value by normalized block spatial local activity, and adjusting the QP value by normalized block temporal local activity. In an embodiment, the adjusting the QP value by normalized block spatial local activity is performed prior to adjusting the QP value by normalized block temporal local activity.

The disclosed method also describes defining a temporal local activity for the block in a reference picture which comprises a difference metric between the block and its co-located block in a picture. The co-located block in the picture can be proximate to the block in the reference picture. The difference metric between the block and its co-located block in a picture can be determined by one of SAD, effort variance, schedule variance, One embodiment teaches a method wherein the QP value for coding the $i^{th}$ block of a reference picture can be further adjusted by the normalized block temporal local activity according to:

act(i) is the temporal local activity measure for a block i of a reference picture, avg_act is the average temporal local activity between a reference picture; and N is the number of blocks within a group of geometrically connected blocks (GOB) in reference picture. The GOB can be one of a block row, multiple block row, slice(s), a block column, multiple block columns, tile(s), and a picture.

In an embodiment, the average temporal local activity for a reference picture, avg_act, can be defined as follows:

$$\text{arithmetic Mean: avg\_act} = \frac{1}{N}\sum_i act(i).$$

In another embodiment, the average temporal local activity for a reference picture, avg_act, can be defined as follows:

avg_act=median{act(i)}

In yet another embodiment, the average temporal local activity for a reference picture, avg_act, can be defined as follows:

$$\text{geometric Mean: avg\_act} = \left(\prod_i act(i)\right)^{\frac{1}{N}}.$$

Another embodiment teaches a method of determining the QP value for a current block i within a current reference picture, can be according to the following:

QP(i)=QP(i)+$\Delta QP_{spatial}$(i) $\Delta QP_{temporal}$(i), wherein QP(i) is the QP value for block i that is determined by rate control, wherein $\Delta QP_{spatial}$(i) is the QP offset due to the normalized block spatial local activity for block i plus the average block offsets per GOB, and wherein $\Delta QP_{temporal}$(i)=$\Delta QP$(i)−$\Delta QP_{pic}$ is the QP offset due to the normalized block temporal local activity for block i plus the average QP offset.

Another embodiment teaches a method wherein, $\Delta QP_{temporal}$(i) is further determined by:

$$\Delta QP(i) = 6 \times \log_2\left(\frac{\beta \times act(i) + \text{avg\_act}}{act(i) + \beta \times \text{avg\_act}}\right),$$

the normalized temporal local activity of block i;

$$\Delta QP_{pic} = 6 \times \left(\frac{1}{N}\sum_{i \in (picture)} \log_2\left(\frac{\beta \times act(i) + \text{avg\_act}}{act(i) + \beta \times \text{avg\_act}}\right)\right)$$

is the average of the normalized temporal local activities for the blocks within a GOB, and β is a constant.

In one embodiment, the modulated final QP can be further adjusted to be within a desirable range.

In one embodiment, $\Delta QP_{pic}$ is the average of normalized temporal local activity of all blocks within a picture.

In an embodiment, $\Delta QP_{pic}$ is an offset for the individual $\Delta QP$ values.

In an embodiment, $\Sigma\Delta QP_{temporal}$⇒0.

Yet another embodiment includes an apparatus for coding stationary areas in reference pictures utilizing temporal local activity as an adjuster for a QP value when coding an $i^{th}$ block of a reference picture. The apparatus can comprise a processor, a memory, communicatively coupled to the possessor, the memory storing instructions comprising instructions for, defining a temporal local activity for the block in a reference picture, determining a QP value by rate control, adjusting the QP value by normalized block spatial local activity, and adjusting the QP value by normalized block temporal local activity.

The embodiment above can also include the QP value for coding an ith block in the reference picture which is further adjusted by the block normalized temporal local activity according to:

act(i) is the temporal local activity measure for a block i of a reference picture;

avg_act is the average temporal local activity between a reference picture; and

N is the number of blocks within a group of geometrically connected blocks (GOB) in reference picture.

One embodiment includes the QP value for normalized block spatial local activity that comprises $\Delta QP_{spatial}$(i) wherein $\Delta QP_{spatial}$(i) comprises the offset due to the normalized block spatial local activity for block i plus the average block offsets per GOB.

BRIEF DESCRIPTION OF THE DRAWINGS

The details of the present disclosure, both as to its structure and operation, may be understood in part by study of the accompanying drawings, in which like reference numerals refer to like parts. The drawings are not necessarily to scale, emphasis instead being placed upon illustrating the principles of the disclosure.

FIG. 1 is a diagram depicting an exemplary embodiment of a video coding-decoding system that can be used for transmission and/or storage and retrieval of audio and/or video information;

DETAILED DESCRIPTION

An example embodiment of the present invention and its potential advantages are best understood by referring to FIGS. 1-7 of the drawings, like numerals being used for like and corresponding parts of the various drawings. The FIGS. 1-7, discussed below, and the various embodiments used to describe the principles of the present disclosure are by way of illustration only and should not be construed in any way to limiting the scope of the disclosure. Those skilled in the art will understand the principles of the present disclosure may be implements in any suitably arranged mobile communication device, server and clients.

Figure 1:
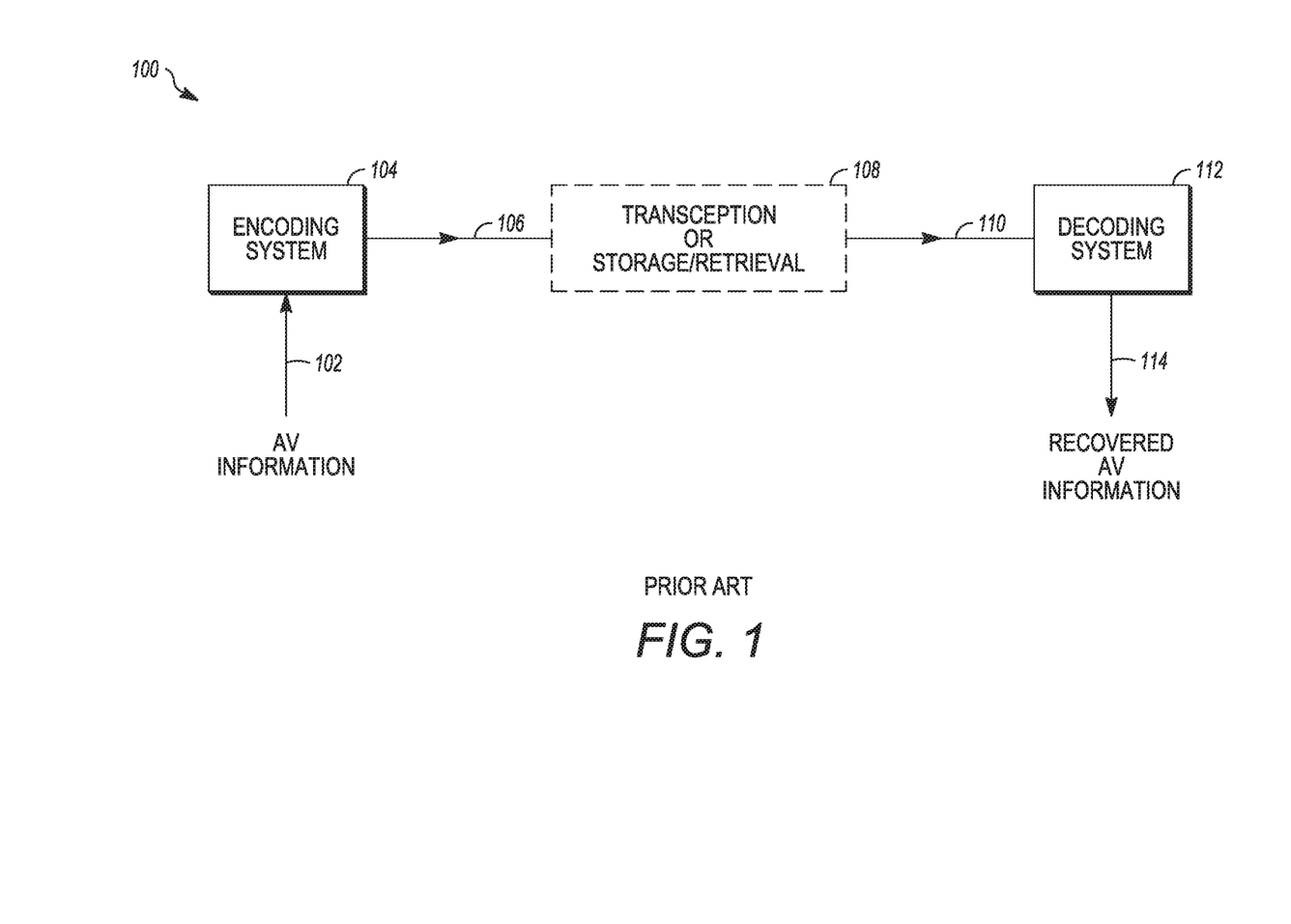
FIG. 1 is an overview of an illustrative motion compensated encoder.

FIG. 1 is a diagram depicting an exemplary embodiment of a video coding-decoding (codec) system 100 that can be used for transmission and/or storage and retrieval of audio and/or video information. The codec system 100 comprises an encoding system 104, which accepts audio-visual (AV) information 102 and processes the AV information 102 to generate encoded (compressed) AV information 106, and a decoding system 112, which processes the encoded AV information 106 to produce recovered AV information 114. Since the encoding and decoding processes are not lossless, the recovered AV information 114 is not identical to the initial AV information 102, but with judicious selection of the encoding processes and parameters, the differences between the recovered AV information 114 and the unprocessed AV information 102 are acceptable to human perception.

The encoded AV information 106 is typically transmitted or stored and retrieved before decoding and presentation, as performed by transception (transmission and reception) or storage/retrieval system 108. Transception losses may be significant, but storage/retrieval losses are typically minimal or non-existent, hence, the transcepted AV information 110 provided to the decoding system 112 is typically the same as or substantially the same as the encoded AV information 106.

Figure 2:
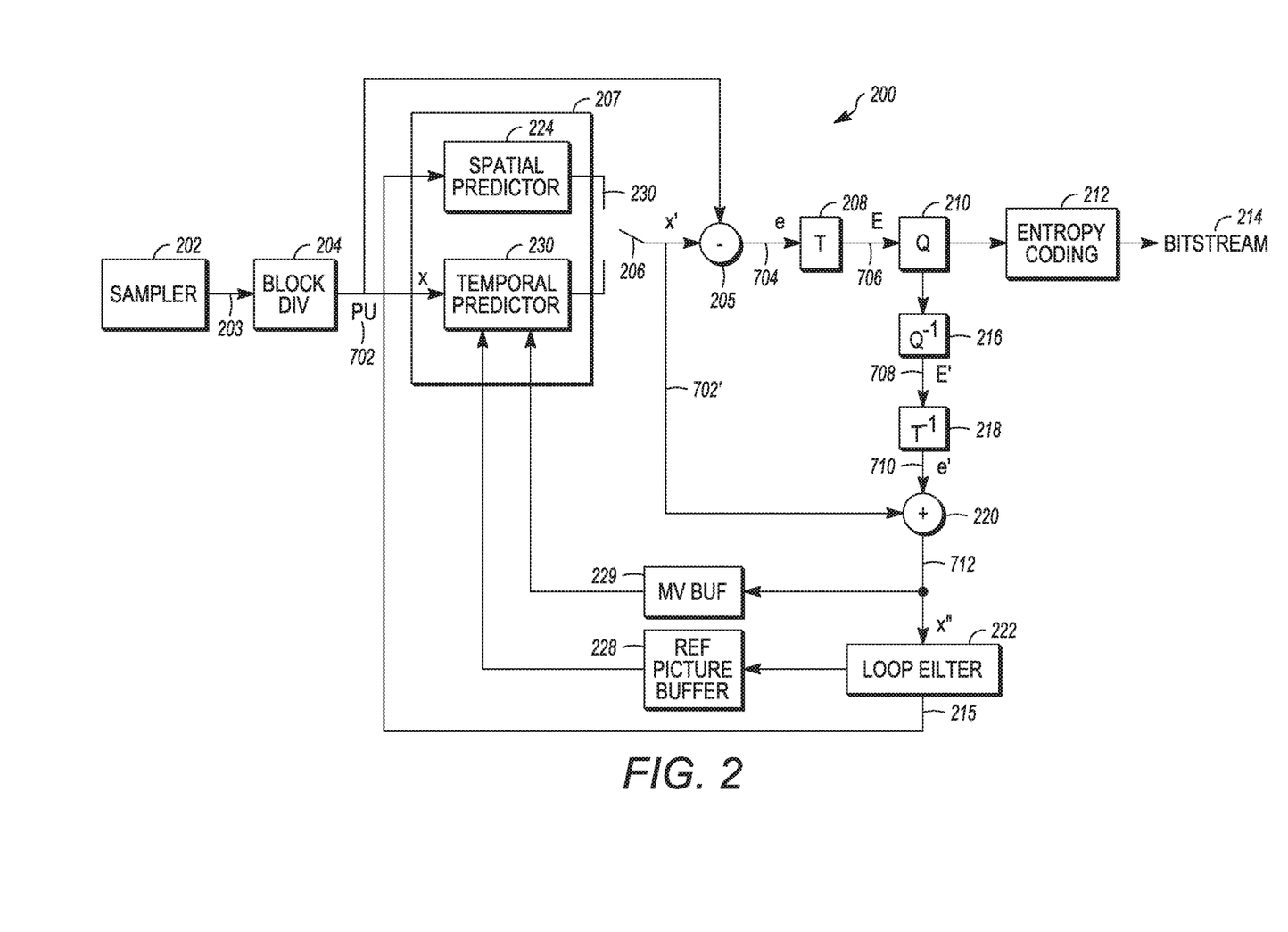
FIG. 2 is a block diagram illustrating one embodiment of the source encoder.

FIG. 2 is a block diagram illustrating one embodiment of source encoder. The source encoder accepts AV information and uses sampler 202 sample the AV information 102 to produce a sequence 203 of successive of digital images or pictures, each having a plurality of pixels. A picture can comprise a frame or a field, wherein a frame is a complete image captured during a known time interval, and a field is the set of odd-numbered or even-numbered scanning lines composing a partial image.

The sampler 202 produces an uncompressed picture sequence 203. Each digital picture can be represented by one or more matrices having a plurality of coefficients that represent information about the pixels that together comprise the picture. The value of a pixel can correspond to luminance or other information. In the case where several components are associated with each pixel (for example red-green-blue components or luminance-chrominance components), each of these components may be separately processed.

Images can be segmented into "slices" which may comprise a portion of the picture or may comprise the entire picture. In the H.264 standard, these slices are divided into coding entities called macroblocks (generally blocks of size 16 pixels×16 pixels) and each macroblock may in turn be divided into different sizes of data blocks 102, for example 4×4, 4×8, 8×4, 8×8, 8×16, 16×8. HEVC expands and generalizes the notion of the coding entity beyond that of the macroblock.

HEVC Coding Entities: CTU, CU, PU and TU

Like other video coding standards, HEVC is a block-based hybrid spatial and temporal predictive coding scheme. However, HEVC introduces new coding entities that are not included with H.264/AVC standard. These coding entities include (1) Coding tree block (CTUs), coding units (CUs), the predictive units (PUs) and transform units (TUs)

Spatial and Temporal Prediction

One of the techniques used to compress a bitstream 214 is to forego the storage of pixel values themselves and instead, predict the pixel values using a process that can be repeated at the decoder and store or transmit the difference between the predicted pixel values and the actual pixel values (known as the residual). So long as the decoder can compute the same predicted pixel values from the information provided, the actual picture values can be recovered by adding the residuals to the predicted values. The same technique can be used to compress other data as well.

Referring back to FIG. 2, each PU 702 of the CU being processed is provided to a predictor module 207. The predictor module 207 predicts the values of the PUs 702 based on information in nearby PUs 702 in the same frame (intra-frame prediction, which is performed by the spatial predictor 224) and information of PUs 702 in temporally proximate frames (inter-frame prediction, which is performed by the temporal predictor 230). Temporal prediction, however, may not always be based on a collocated PU, since collocated PUs are defined to be located at a reference/non-reference frame having the same x and y coordinates as the current PU 702. These techniques take advantage of spatial and temporal dependencies between PUs 702.

Encoded units can therefore be categorized to include two types: (1) non-temporally predicted units and (2) temporally predicted units. Non-temporally predicted units are predicted using the current frame, including adjacent or nearby PUs 702 within the frame (e.g. intra-frame prediction), and are generated by the spatial predictor 224. Temporally predicted units are predicted from one temporal picture (e.g. P-frames) or predicted from at least two reference pictures temporally ahead and/or behind (i.e. B-frames).

Figure 3:
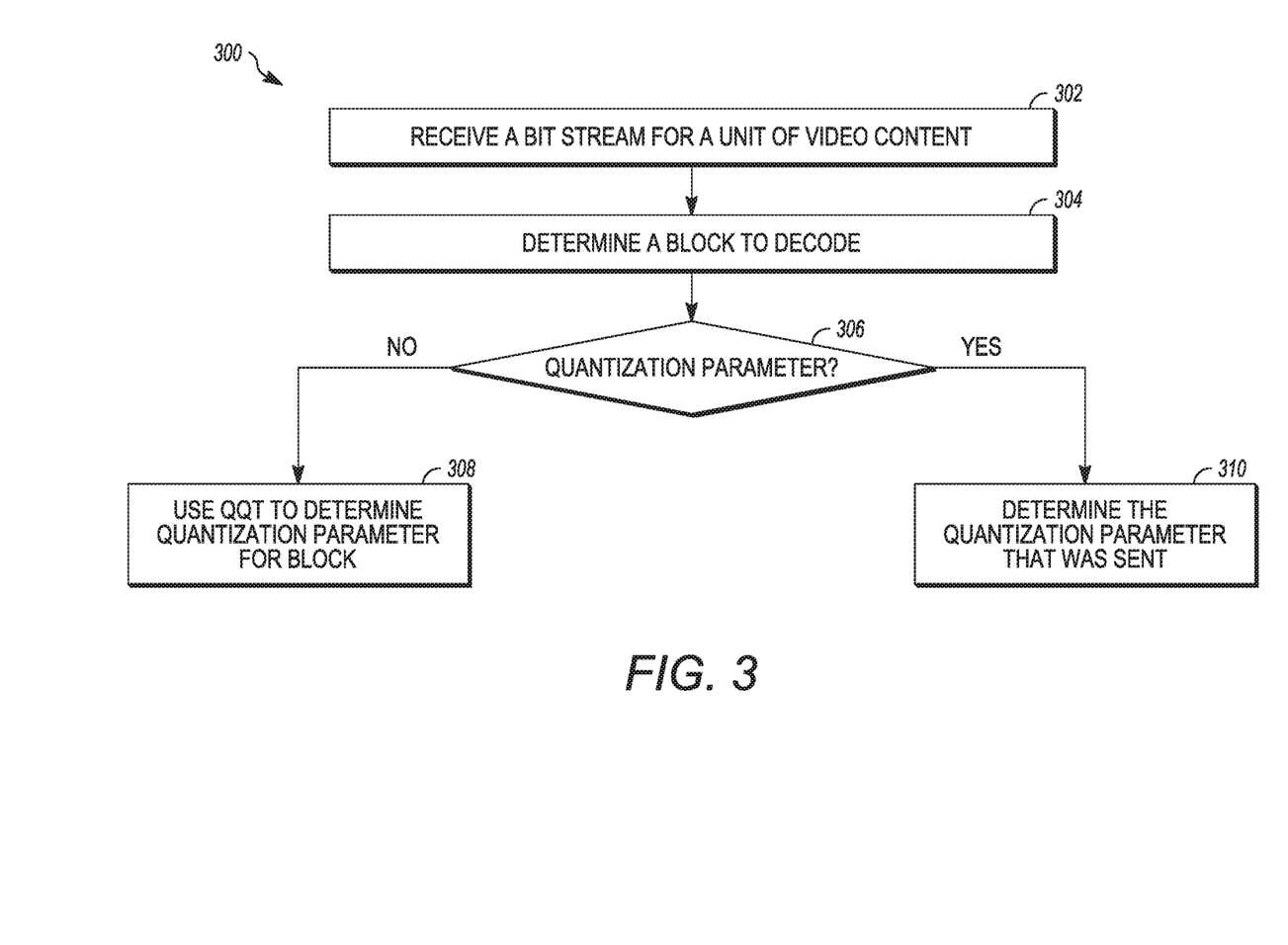
FIG. 3 illustrates a process for determining a QP offset.

Hence, the solutions disclosed herein solve the problem of providing subjectively better quality in video coding. The embodiments described herein also describe a way to temporal local activity as a step in QP offset determination. FIG. 3 shows an example of a system for encoding and decoding video content according to one embodiment. The system includes an encoder 300 and a decoder 301.

A quantization parameter (QP) is allowed to vary from block to block, such as from coding unit (CU) to CU. Particular embodiments use a quantization unit (QU) to represent an area with the same quantization parameter. For example, a quantization unit may cover multiple CUs. As will be discussed, below, overhead in signaling between encoder 300 and decoder 301 may be saved by not sending information for quantization parameters, or offsets, for some blocks within a quantization unit, which will be described in more detail below.

Figure 4:
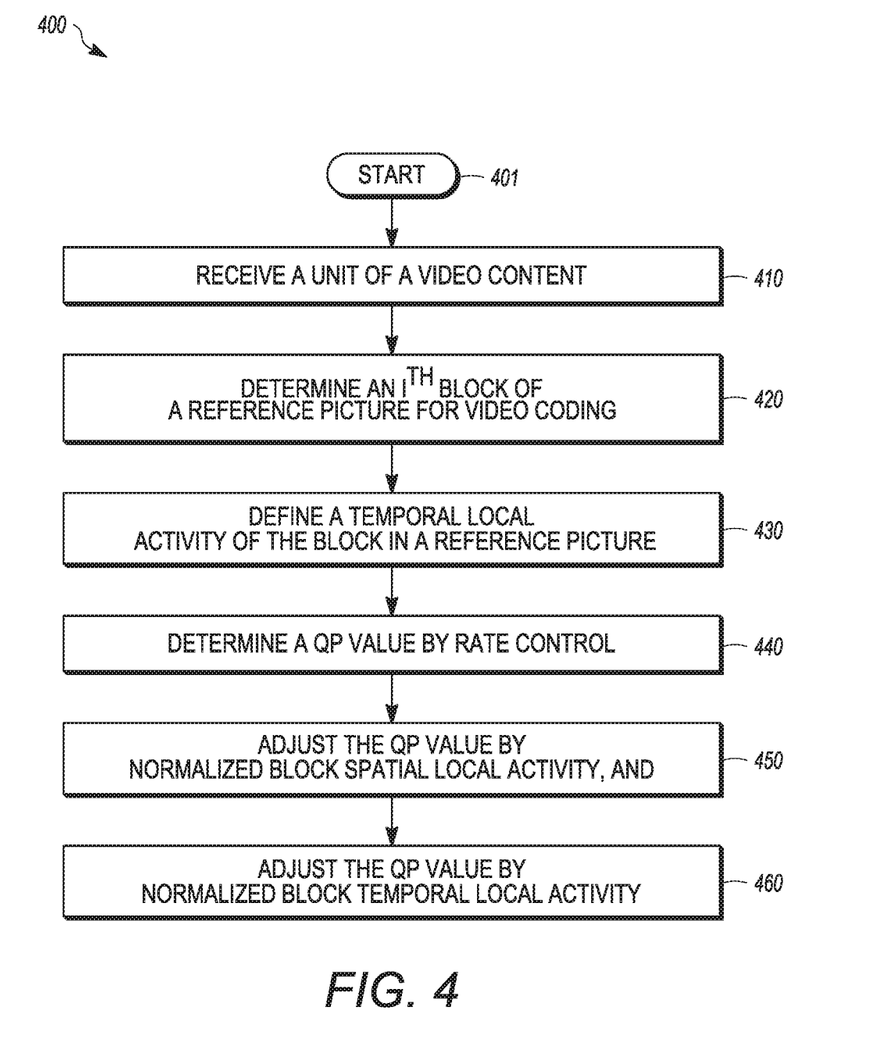
FIG. 4 illustrates a process for determining QP offset for video coding.

FIG. 4 illustrates a process for determining a QP offset. Beginning with step 410, a unit of video content is received. Moving to step 420, an $i^{th}$ block of a reference picture for video coding is determined. At 430, a temporal local activity of the block in a reference picture is determined. At step 440, a QP value is determined by rate control. At step 450, the QP value is adjusted by normalized block spatial local activity. At step 460, adjust the QP value by normalized block temporal local activity.

As noted above, spatial local activity has successfully been used in video coding for better subjective quality, which assigns relatively smaller quantization stepsizes to flat areas, such as blue sky, and larger quantization stepsizes to busy areas, such as grass. Embodiments described herein define uses of temporal local activity resulting in higher quality of these video pictures.

Temporal Local Activity

Most of video coding standards, such as AVC and HEVC, use both intra (I) and inter (P and B) pictures. Intra picture is coded without referring to other pictures; only spatial coding operations, such as block transform and quantization, are involved. Inter pictures are temporally predictive coded, where the temporal predictive residuals are first calculated using block-based motion estimation and compensation, and then coded using the similar spatial coding operations to intra picture.

Natural video sequences may contain some motion areas and some stationary areas. The prediction residuals for the stationary are often very small. The blocks in the stationary areas therefore may be coded in skip mode after quantization. At the decoding end, the blocks in skip mode will simply take the prediction blocks from the corresponding reference pictures as the final reconstructed blocks. The reconstructed quality of the stationary areas will be carried over to many future pictures in coding order. Hence, the quality of these stationary areas in reference pictures are important for those skipped blocks in stationary areas.

It is therefore proposed that the stationary areas in reference pictures should be coded using relatively smaller QP as compared to the moving areas for better subjective quality.

In the embodiments described herein, defining a temporal local activity for a block in a reference picture is determined first, and then the temporal local activity is utilized to further adjust the QP value for a block in a reference picture.

Figure 5:
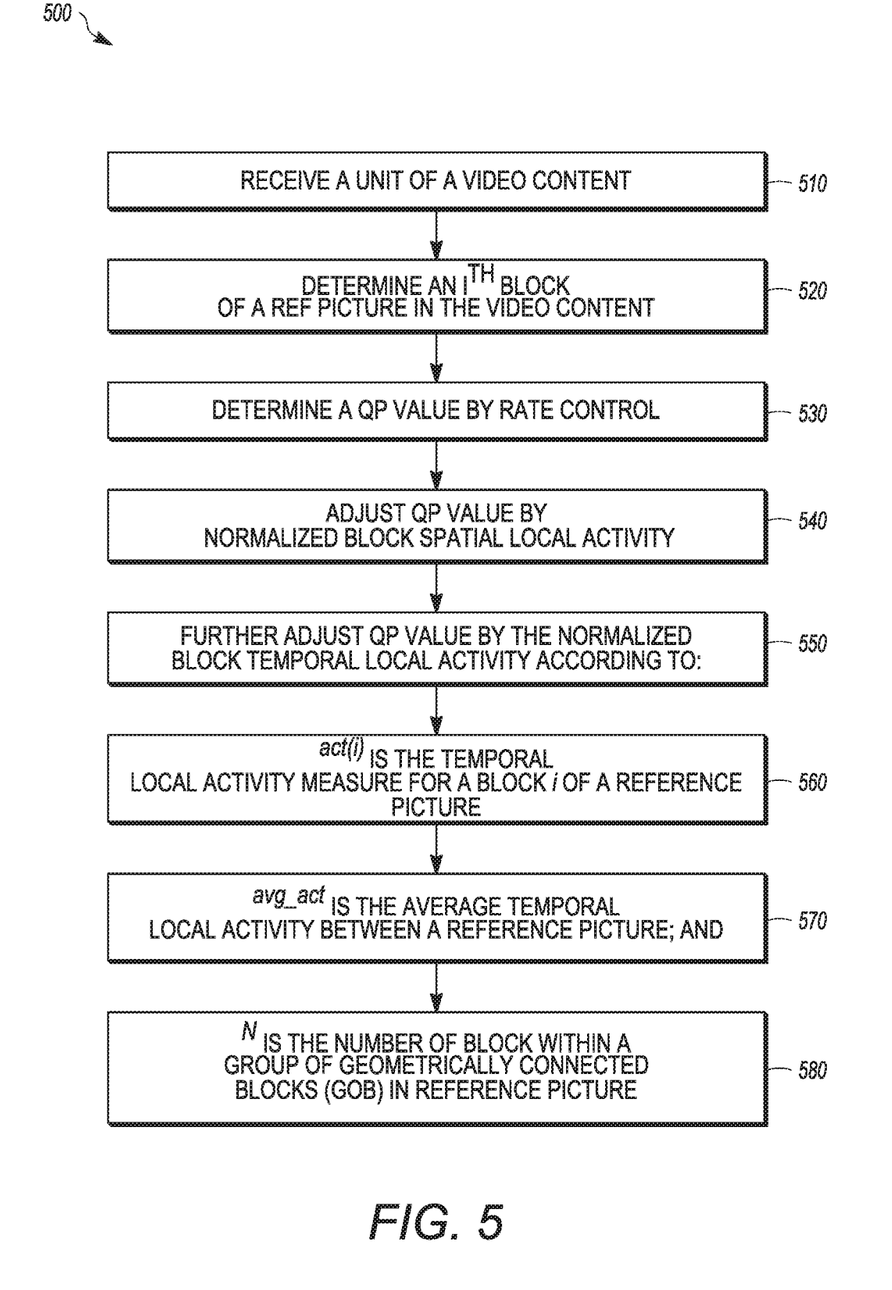
FIG. 5 illustrates a process for further adjusting QP offset for video coding.

The flowchart in FIG. 5 provides a more general understanding of the process for further adjusting QP offset for video coding, particularly as it relates to step 460. At step 510, a unit of video content is received. At step 520, an ith block of a reference picture in the video content is determined. At step 530, a QP Value by rate control is determined. At step 540, the QP value by normalized block spatial local activity is further adjusted by the normalized block temporal local activity, according to certain parameters.

At step 560, act(i) is the temporal local activity measure for a block I of a reference picture.

At step 570, avg_act is the average temporal activity between a reference picture.

And finally, at 580, N is the number of blocks within a group of geometrically connected blocks (GOB) in a reference picture.

Temporal Local Activity

The temporal local activity for a block in a picture can be defined as a difference metric between the block and its collocated block in a picture, for example, the closest picture, that uses the reference picture for motion estimation and compensation. The difference metric can be, for example SAD, variance or other metrics.

QP Modulation using Temporal Local Activity

As shown in the preceding figures and description, typically, in video coding, the QP value for a block is first determined, for example by rate control. The QP value may then be modulated by the block normalized spatial local activity for better subjective quality.

To address the issues with the stationary areas, the embodiments herein disclose that the QP value for a block in reference picture be further adjusted by the block normalized temporal local activity. In illustrating an embodiment, let:

1. act(i) be the temporal local activity measure for a block i of a reference picture, 2. avg_act be the average temporal local activity between a reference picture, 3. N be the number of blocks within a group of geometrically connected blocks (GOB) in reference picture. A GOB can be, for example, a block row, multiple block row, slice(s), a block column, multiple block columns, tile(s), a picture, or another relevant measure.

The average temporal local activity for a reference picture, avg_act, can be defined in various way. Following are three examples.

The average temporal local activity for a reference picture, avg_act, can be defined as Arithmetic Mean:

$$\text{avg\_act} = \frac{1}{N}\sum_i act(i).$$

The average temporal local activity for a reference picture, avg_act, can be defined as avg_act=median {act (i)}

The average temporal local activity for a reference picture, avg_act, can be defined as Geometric Mean:

$$\text{avg\_act} = \left(\prod_i act(i)\right)^{\frac{1}{N}}.$$

Figure 6:
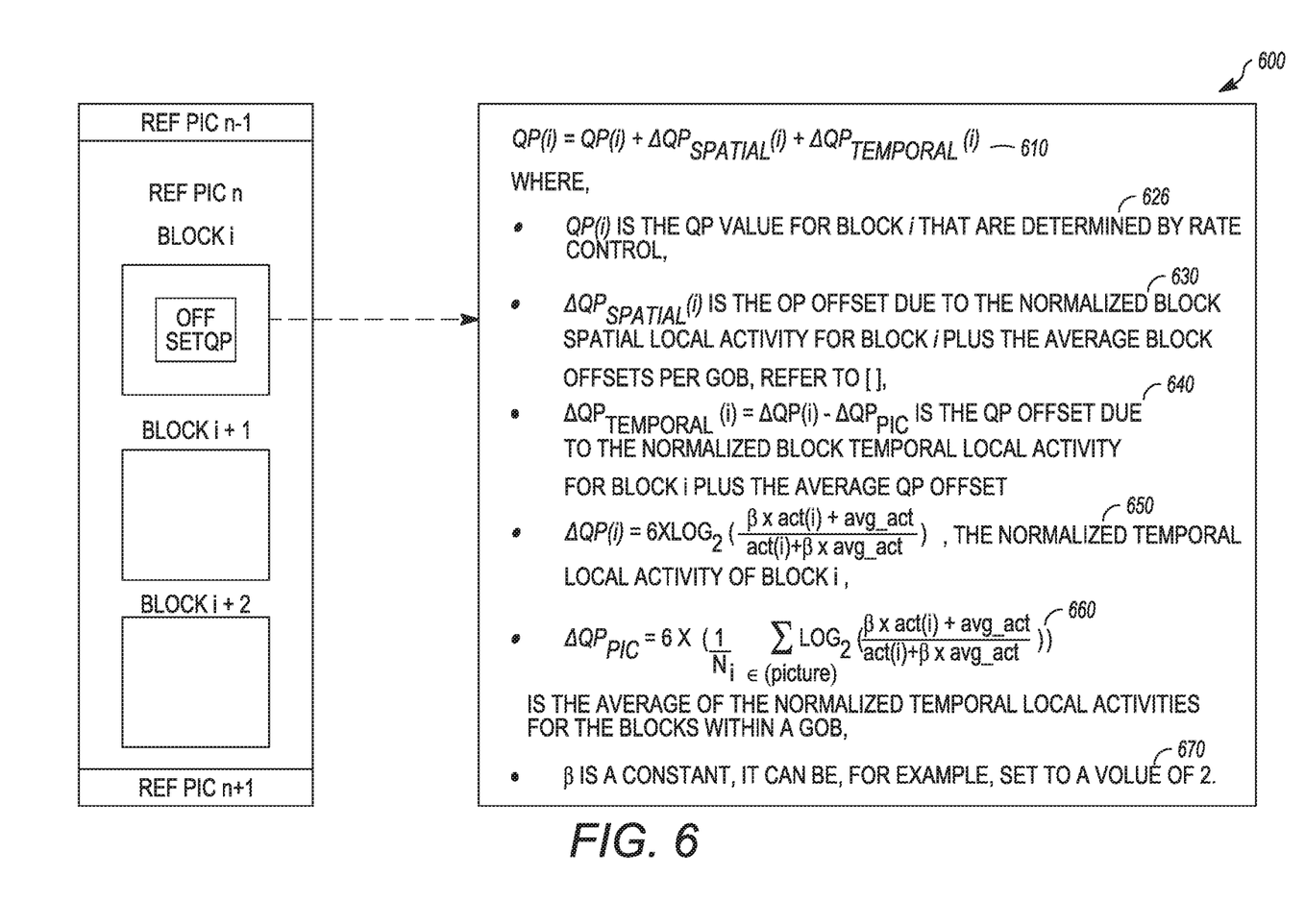
FIG. 6 is an example of a method for determining QP offset in an ith block of a reference picture.

FIG. 6 is an example of a method for determining QP offset in an $i^{th}$ block of a reference picture, as previously shown in the figures above and their corresponding descriptions. The pseudo code for calculating the QP offset value is illustrated in 600.

For a current block i within a current reference picture, the QP value determined by rate control is further adjusted by a QP offset due to the normalized block spatial local activity and a QP offset due to the normalized block temporal local activity for a better subjective quality as QP(i)=QP(i)+ΔQP$_{spatial}$(i) ΔQP$_{temporal}$(i)

where,

QP(i) is the QP value for block i that are determined by rate control,

ΔQP$_{spatial}$(i) is the QP offset due to the normalized block spatial local activity for block i plus the average block offsets per GOB, refer to [ ], ΔQP$_{temporal}$(i)=ΔQP(i)−ΔQP$_{pic}$ is the QP offset due to the normalized block temporal local activity for block i plus the average QP offset $$\Delta QP(i) = 6 \times \log_2\left(\frac{\beta \times act(i) + \text{avg\_act}}{act(i) + \beta \times \text{avg\_act}}\right),$$

the normalized temporal local activity of block i, $$\Delta QP_{pic} = 6 \times \left(\frac{1}{N}\sum_{i \in (picture)} \log_2\left(\frac{\beta \times act(i) + \text{avg\_act}}{act(i) + \beta \times \text{avg\_act}}\right)\right)$$

is the average of the normalized temporal local activities for the blocks within a GOB, β is a constant. It can be, for example, set to a value of 2.

The modulated final $Q^P$ may need to be further clipped into the allowable range.

ΔQP$_{pic}$ is the average of normalized temporal local activates of all blocks within a picture. Therefore, it can be considered as an offset for the individual ΔQP values. The total contribution of the temporal local activities over a picture should tend to be equal to zero, that is, $\Sigma \Delta QP_{temporal} \Rightarrow 0$.

Figure 7:
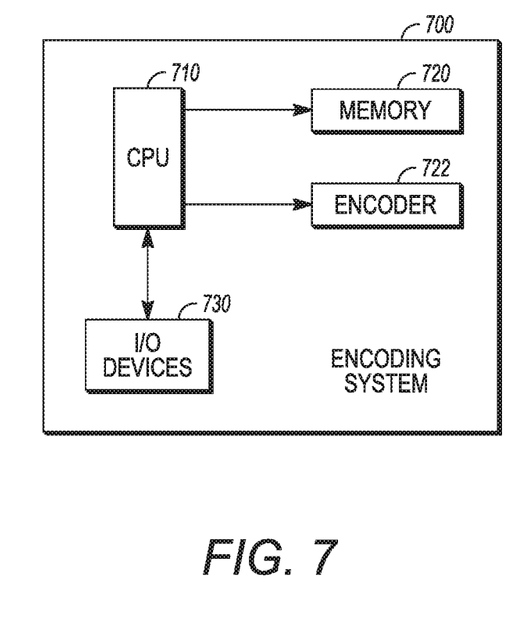
FIG. 7 illustrates an embodiment implemented using a general purpose computer.

FIG. 7 is a block diagram of the present encoding system being implemented with a general purpose computer. In one embodiment, the encoding system 700 is implemented using a general purpose computer or any other hardware equivalents. More specifically, the encoding system 700 comprises a processor (CPU) 710, a memory 720, e.g., random access memory (RAM) and/or read only memory (ROM), an encoder 722 employing the present method of an external FPME, and various input/output devices 630 (e.g., storage devices, including but not limited to, a tape drive, a floppy drive, a hard disk drive or a compact disk drive, a receiver, a transmitter, a speaker, a display, an output port, a user input device (such as a keyboard, a keypad, a mouse, and the like), or a microphone for capturing speech commands).

It should be understood that the encoder 722 can be implemented as physical devices or subsystems that are coupled to the CPU 710 through a communication channel. Alternatively, the encoder 722 can be represented by one or more software applications (or even a combination of software and hardware, e.g., using application specific integrated circuits (ASIC)), where the software is loaded from a storage medium (e.g., a magnetic or optical drive or diskette) and operated by the CPU in the memory 720 of the computer. As such, the encoder 722 (including associated data structures and methods employed within the encoder) of the present invention can be stored on a computer readable medium or carrier, e.g., RAM memory, magnetic or optical drive or diskette and the like.

As disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium and executed by one or more processors.

Although the subject matter has been described in language specific to structural features and/or methodological acts, it is to be understood that the subject matter defined in the appended claims is not necessarily limited to the specific features or acts described above. Rather, the specific features and acts described.

Accordingly, the present disclosure is not limited to only those implementations described above. Those of skill in the art will appreciate that the various illustrative modules and method steps described in connection with the above described figures and the implementations disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the disclosure. In addition, the grouping of functions within a module or step is for ease of description. Specific functions can be moved from one module or step to another without departing from the disclosure.

The various illustrative modules and method steps described in connection with the implementations disclosed herein can be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in computer or machine readable storage media such as RAM memory, flash memory, ROM memory, EPROM memory, EEPROM memory, registers, hard disk, a removable disk, a CD-ROM, or any other form of storage medium including a network storage medium. An example storage medium can be coupled to the processor such that the processor can read information from, and write information to, the storage medium. In the alternative, the storage medium can be integral to the processor. The processor and the storage medium can also reside in an ASIC.

While the foregoing is directed to embodiments of the present invention, other and further embodiments of the invention may be devised without departing from the basic scope thereof, and the scope thereof is determined by the claims that follow.

We claim:

1. A method of determining the QP value for a current block i within a current reference picture, according to the following:

$QP(i)=QP(i)+\Delta QP_{spatial}(i)+\Delta QP_{temporal}(i)$, wherein QP(i) is the QP value for block i that is determined by rate control, wherein $\Delta QP_{spatial}(i)$ is the QP offset due to the normalized block spatial local activity for block i plus the average block offsets per GOB, wherein $\Delta QP_{temporal}(i)=\Delta QP(i)-\Delta QP_{pic}$ is the QP offset due to the normalized block temporal local activity for block i plus the average QP offset, and wherein $\Delta QP_{temporal}(i)$ is further determined by:

$$\Delta QP(i) = 6 \times \log_2\left(\frac{\beta \times act(i) + \text{avg\_act}}{act(i) + \beta \times \text{avg\_act}}\right),$$

the normalized temporal local activity of block, i ; and $$\Delta QP_{pic} = 6 \times \left(\frac{1}{N} \sum_{i \in (picture)} \log_2\left(\frac{\beta \times act(i) + \text{avg\_act}}{act(i) + \beta \times \text{avg\_act}}\right)\right)$$

is the average of the normalized temporal local activities for the blocks within a GOB, and β is a constant.

2. The method of claim 1, wherein $\Delta QP_{pic}$ is the average of normalized temporal local activity of all blocks within a picture.

3. The method of claim 1, wherein $\Delta QP_{pic}$ is an offset for the individual ΔQP values.

* * * * *